US005455904A

United States Patent [19]

Bouchet et al.

[11] Patent Number: 5,455,904

[45] Date of Patent: Oct. 3, 1995

[54] METHOD OF SIZING OR MOVING WINDOWS

[75] Inventors: Alain Bouchet, Franconville; Alain Marie-Sainte, Creteil, both of France

[73] Assignee: Bull S.A., Paris, France

[21] Appl. No.: 344,331

[22] Filed: Nov. 22, 1994

Related U.S. Application Data

[63] Continuation of Ser. No. 844,644, Apr. 23, 1992, abandoned.

[30] Foreign Application Priority Data

Aug. 2, 1990 [FR] France .................................. 90 09884

[51] Int. Cl.$^{6}$ .................................................. G06F 3/153

[52] U.S. Cl. ............................................ 395/157; 395/161

[58] Field of Search .................................. 395/155, 157, 395/158, 161

[56] References Cited

U.S. PATENT DOCUMENTS

| | | | |
|---|---|---|---|
| 4,831,556 | 5/1989 | Oono | 395/157 |
| 5,001,697 | 3/1991 | Torres | 395/157 X |
| 5,060,170 | 10/1991 | Bourgeois et al. | 395/157 |
| 5,175,813 | 12/1992 | Golding et al. | 395/157 |
| 5,227,771 | 7/1993 | Kerr et al. | 395/157 X |

OTHER PUBLICATIONS

Microsoft Windows User's Guide (Trademark of Microsoft Corporation), 1990, pp. 20, 24, 41–43.

*Primary Examiner*—Heather R. Herndon
*Assistant Examiner*—Cliff Nguyen Vo
*Attorney, Agent, or Firm*—Weingarten, Schurgin, Gagnebin & Hayes

[57] ABSTRACT

A method of sizing or moving application windows in a windowed operating system environment. The method described allows application windows to be moved or sized without blocking application processing from proceeding in other application windows in the environment. The method comprises the steps of establishing at least one filter between an application window to be sized or moved and the windowed operating system, intercepting messages travelling between the operating system and the application window, processing those messages, and returning a neutral message to the windowed operating system. The neutral message does not require the windowed operating system to take further action, thereby permitting the windowed operating system to proceed with application processing tasks in other windows.

24 Claims, 4 Drawing Sheets

| | | Mouse | Keyboard |
|---|---|---|---|
| Moving window | Iconic | Differenciation between begin of movement and menu execution. | |
| | Non Iconic | | |
| Sizing window | Iconic | X | X |
| | Non Iconic | ○ | Detection of sizing direction |

FIG.3

METHOD OF SIZING OR MOVING WINDOWS

This application is a continuation of application Ser. No. 07/844,644, filed Apr. 23, 1992, now abandoned.

The invention relates to a method of sizing or moving windows.

A window-sizing or moving method is known in particular from the Microsoft "Windows" multi-window multitasking program. This type of program has the disadvantage, when a window is being sized or moved, of blocking the development of applications running in the other windows.

The goal of the present invention is to overcome this disadvantage.

This goal is achieved by the fact that the window-sizing and moving method in a "Windows" application consists of interposing between "Windows" and the various applications running in "Windows," filters intercepting particular messages, processing these messages by a specific application, and sending to "Windows" a neutral message which triggers no action on the part of "Windows" and does not block the running of the other applications.

According to another feature, the processing conducted by the specific application consists of processing each of the particular events that can occur, corresponding potentially to a window move event or a window sizing event, and during this processing, of calling on specific functions allowing initialization of a number of parameters, W_Top, W_Right, W_Bottom, W_Left, W_Caption, Frm_CurPos, h_WndCurr, which are stored until a later event occurs, triggering the end of processing.

According to another feature, the parameters stored are constituted by:

"h_WndCurr"='h_WndCurrent" which is a variable showing that an action has been started in any window;

"b_LoadedIcon", to memorize that an icon has been loaded;

"h_WndMenu", which is the variable showing, in the case of an icon, whether one is in a menu run or an icon move phase;

"h_OldCursor", which is the variable allowing an identifier of the "Windows" active cursor to be memorized before the application is launched and the specific cursor of the application is replaced;

"w_CXScreen", "w_CYScreen", "w CXframe", "w_CYMinHeight", "w_CXMinWidth", which are the coordinate variables of the window during sizing, frame, and minimum width, respectively;

"Frm_CurPos", which is the current frame position variable;

"Mse_CurPos", which is the current mouse position variable;

"w_Left", "w_Top", "w_Right", "w_Bottom", "w_Caption", which are the direction variables used to calculate the coordinates of the new window and the direction tests;

"Wnd_StartPos", which is the variable defining the initial position of the window;

"Mse_StartPos", which is the variable defining the initial position of the cursor;

"b_Cursor" and "b_LoadedIcon", which are the Boolean variables assumed to be false at the start.

According to another feature, there are two filters. A first "WM_GETMESSAGE" filter allows messages posted by hardware interrupts such as:

WM_NCLBUTTONDOWN

WM_MOUSEMOVE

WM_KEYDOWN

WM_SYSKEYDOWN to be received, and a second "WH_CALLWNDPROC" filter allowing messages sent to the method [sic] such as:

WM_SYSCOMMAND

WM_ACTIVATEAPP

WM_NCACTIVATE

WM_ACTIVATE.

to be filtered and received.

According to another feature, intercepting a message triggers the processing of a program specific to each message and brings in the stored parameters and the principal processing functions such as:

ABMSInit to initialize processing,

ABMSMove to move the window,

ABMSEnd to end processing, which themselves call utility functions.

According to another feature, the ABMSInit function is implemented only to process the messages "WM_NCLBUTTONDOWN" and "SC_SIZE" which is a message depending on "WM_SYSCOMMAND."

According to another feature, the ABMSEnd function is implemented only to process the "WM_LBUTTONUP" and "VK_ESCAPE", "VK_RETURN" messages which depend on "WM_SYSKEYDOWN."

According to another feature, the ABMSMove function is implemented only to process "WM_MOUSEMOVE, MK_LEFT, VK_UP, VK_RIGHT, and VK_DOWN" messages which are messages depending on "WM_SYSKEYDOWN."

According to another feature, the ABMSInit function consists of appropriating mouse messages by the "SETCAPTURE" instruction, then looking to see whether the window is a child window of a parent window, namely written in the parent window to limit the movements of the child window, then initializing the initial coordinates of the window and the position of the cursor to become current coordinates and initializing the characteristic parameters of the window (w_CXframe, w_CXMinWidth, w_CYMinHeight).

According to another feature, the method comprises the following stages:

transition of the filters to active mode;

memorizing the identifier of the "h_Wnd" window to which the message is sent;

memorizing the type of action resulting from the click zone, which memorization is accomplished by the HitTest function and the ABMSInit function;

appropriating later mouse messages for the window in question;

first drawing of ghost frame around the window by the InvertBlock procedure;

neutralizing the message by replacing and substituting a "WM_ENTERIDLE" message which is not processed and triggers no action on the part of "Windows".

According to another feature, the method includes the following stages:

calculating the final coordinates of the window by the ABMSComputNewPos procedure, erasing the ghost by InvertBlock;

drawing the window in the final position by the ABMSMove function;

resetting the memorization parameters to zero by the ABMSEnd function.

According to a last feature, the method also comprises the following stages:

abandoning ownership of the mouse messages by the "Release Capture" instruction;

passage of the filter into passive mode.

Other characteristics and advantages of the present invention will emerge more clearly from reading the description below, which refers to the attached drawings wherein:

FIG. 3 represents a table of possible scenarios;

Figure 4:
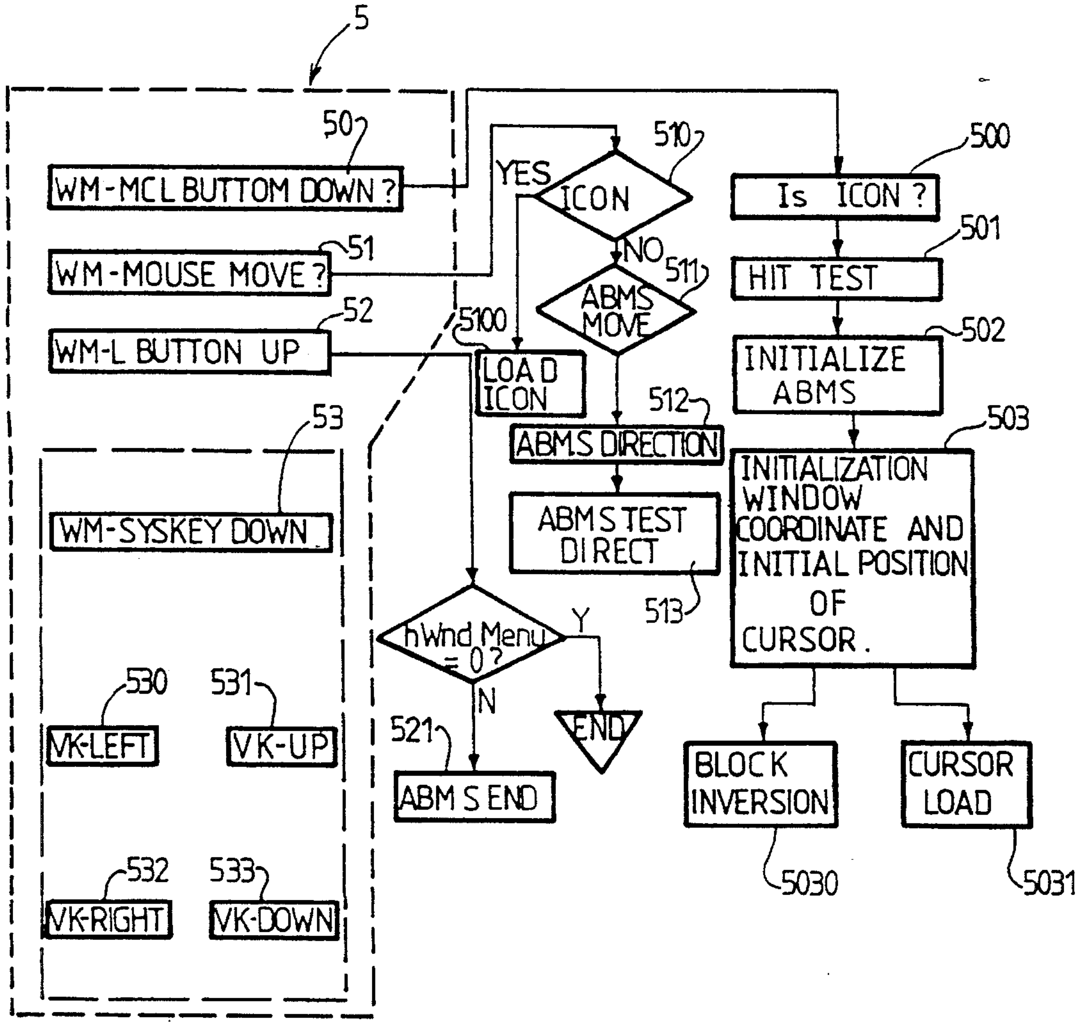
FIG. 4 is a flowchart of the interpretation program once the filtering function has been loaded.

Appendices 1 to 8 show in detail the various stages represented in the flowchart of FIG. 4.

The invention relates to an improvement of a multitask, multi-window program operating on computer equipment comprising a central processing unit or processor, a display monitor, a keyboard resource, and a mouse.

Figure 5:
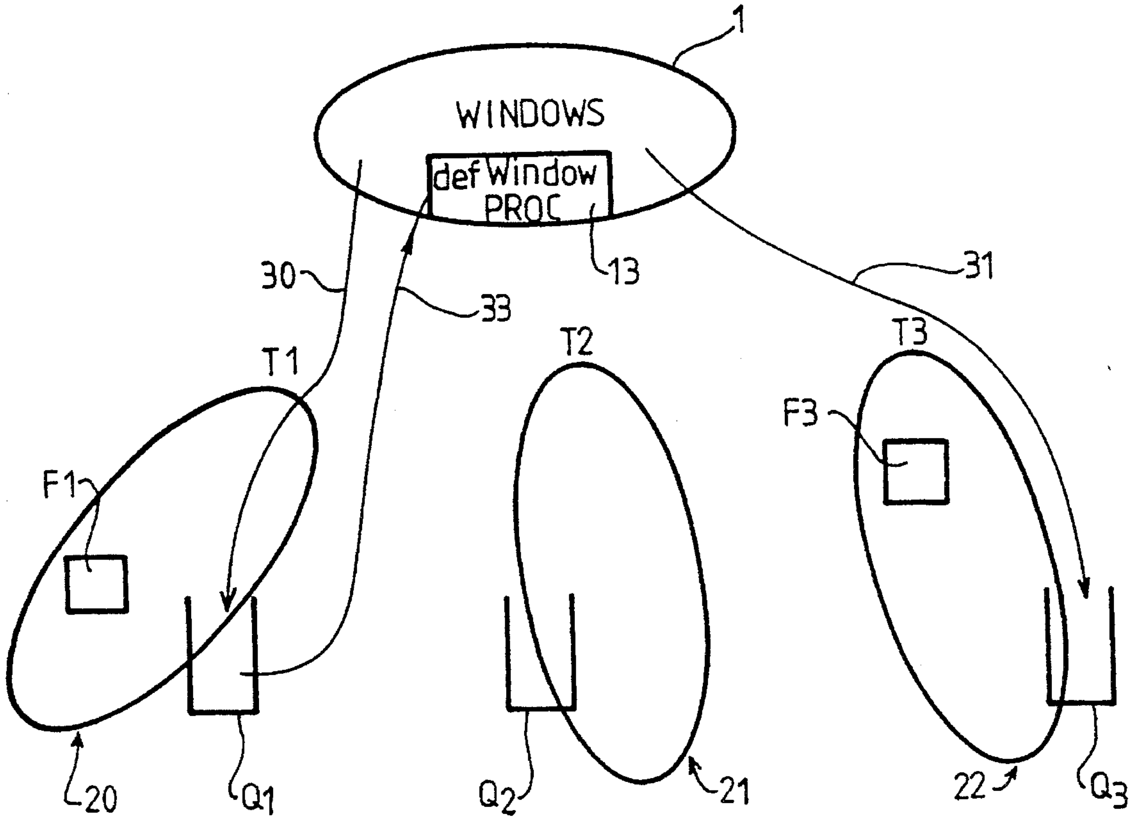
FIG. 5 PRIOR ART
FIG. 5 represents the prior art of the invention.

In the prior art of FIG. 5, showing the operation of a program that allows several applications to be run with one or more windows per application, a number of drawbacks may be noted. Thus, in a "Windows" environment or OS2, the core (1) of the "Windows" program sends messages (30, 31) in the direction of the various applications or tasks (T1, T2, T3), namely (20, 21, 23), respectively. Core (1) of "Windows" allows messages (30, 31) to be sent to the activated tasks, for example in the case of FIG. 5, tasks (T1) and (T3), and these messages addressed to the respective task to be stacked in a respective queue (Q1, Q3). Core (1) of "Windows" attributes the processor to the application which will then manage the queued messages and process them, and when the queue is empty the task sends the processor to core (1) of "Windows" to allow attribution of the processor to another activated application. Each application (T1, T3) comprises an associated window (F1, F3). Each window constitutes a visible or an invisible object. With each window is associated a method which constitutes the use or reaction mode of the window to the various messages concerning the application window. This method is a program which processes each of the messages and performs actions as a consequence. This program can choose to process some of these messages or allow some others to be processed by "Windows." In the latter case, the application program calls for a message (33) to be sent to a function (13) of "Windows" core (1), which function is called "default Windows Proc." Core (1) of "Windows" is able to recognize these particular messages and, for example in the case of sizing a window or moving it, carries out standard processing. Thus, an operator who wishes to size a window will act on the system 'mouse" which, by interrupting the hardware, generates a number of messages. These messages will be sent and stacked in the queue (Q1), for example, of the application concerned. When it processes the queue, the program passes these messages to the method [sic] of the window, which tries to find out where the mouse is located, namely whether it is on an edge, in the middle, or on a menu zone of the window. Depending on this location, the method generates a number of different messages.

If the mouse is on an edge of the window, the resulting interrupt generates the message "WM_LBUTTONDOWN." When the method recovers this message, it sends it to function (13) "Def Window Proc" and hands off to "Windows." "Windows" detecting this particular message, finds out from which zone of the window it was obtained and, depending on the case, generates a number of messages such as "WM_SIZE" (corresponding to sizing the window) or "WM_MOVE" (corresponding to moving the window) and waits for subsequent messages from the mouse so that it can process them immediately.

The messages sent (30, 31) can be either system messages sent by "Windows" core (1) directly to an application, or messages from the hardware, often after an interrupt, for example mouse messages or keyboard messages. When the method has sent a message to the "Def Wnd Proc" function and as long as the other information concerning window sizing or moving allowing function (13) to end processing the message, has not arrived at this function, the processor continues to execute this function, does not leave it, and waits for other messages. This has the disadvantage of blocking the process of processing other tasks. This disadvantage is particularly troublesome in real time applications, for example in real time monitoring or alarm control. In this type of application, it may occur that a window sizing or move maneuver using the keyboard is started and the interrupted operator blocks all the other applications for the entire time he is unable to complete his window sizing or moving action, using the keyboard or mouse.

Figure 1:
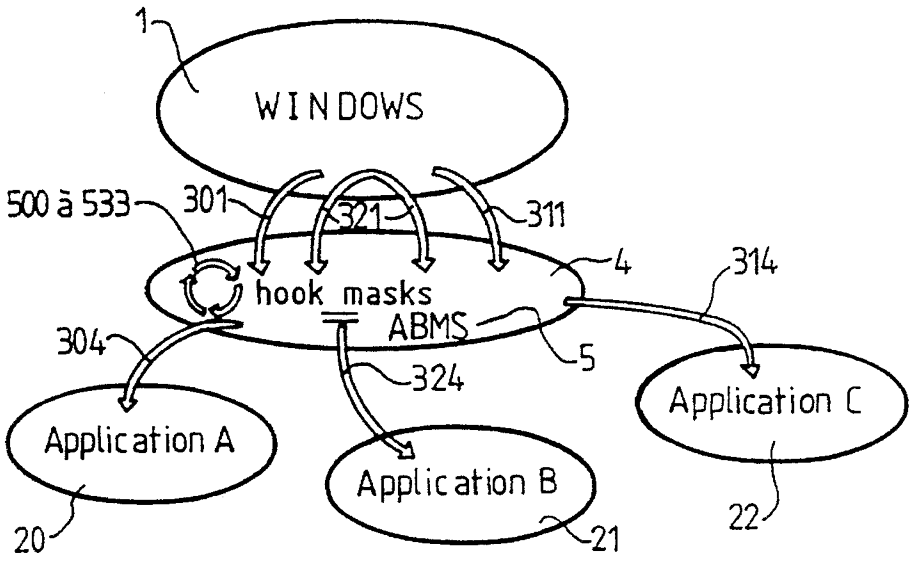
FIG. 1 represents the general path diagram of the invention.
Figure 2:
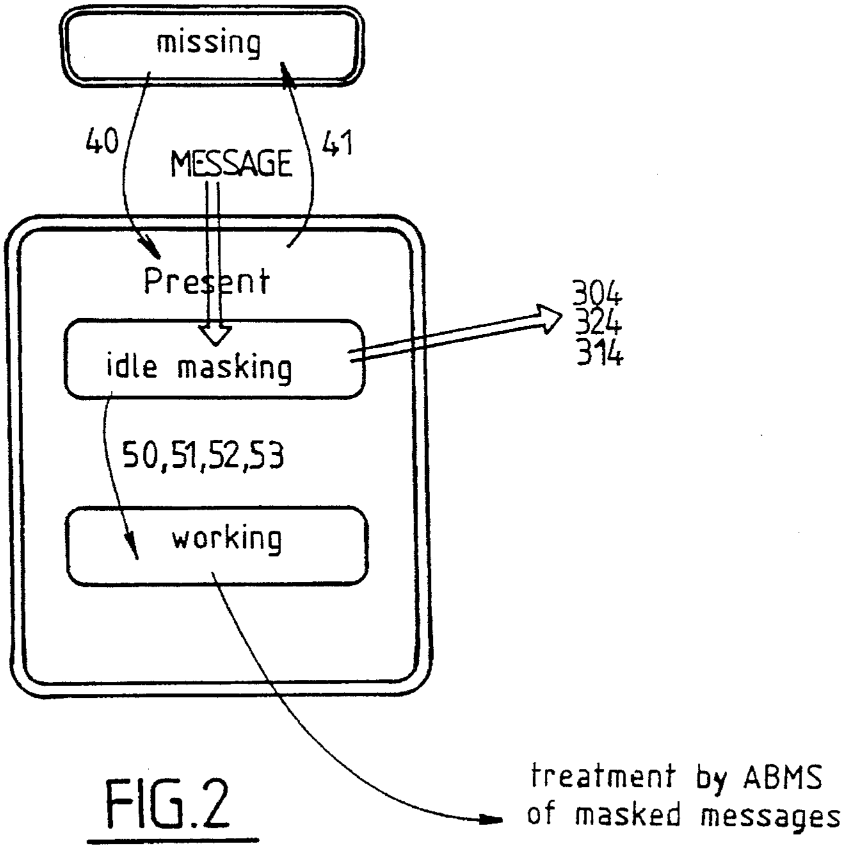
FIG. 2 represents the operating principle of the filters of the invention.

Hence the goal of the invention is to eliminate this disadvantage and offers the architecture of FIG. 1 in which a filter (4) is placed between the various applications (20, 21, 22) and core (1) of "Windows," which filter is hooked to the "Windows" core which, when certain messages go through, ensures processing of these messages by an ABMS application (5). Thus, messages (301, 311, 321, 331) sent by the "Windows" core to applications A, B, C (20, 21, 22) go into filter (4) and, depending on activation or nonactivation, are transmitted or processed by ABMS. In the case of filter activation, certain types of messages are transmitted in the form of messages, (304) to application A, (324) to application B, and (314) to application C. In the case where one of the messages (301, 321, 311) corresponds to a specific event (50, 51, 52, 53) as shown in FIGS. 2 and 4, this message is intercepted and processed by application ABMS (5) as will be seen below.

Hence the invention is based on the use of message filters furnished by "Windows," these filters allowing any application to be informed of the passage of all the messages corresponding to a particular type of event and permitting them to be modified or replaced before they arrive at their true destination.

Thus, the ABMS application (5) uses two of these specific filters. Two filters are necessary to cover all the possible messages in the cases concerning us, because "Windows" classifies all the messages into message families and the messages that concern us belong to two of these families. A "WH_GETMESSAGE" filter (400, Appendix 1) allows receipt of messages posted by the hardware interrupts, namely the mouse or keyboard, which messages would normally have been placed in the application queue. Another "WH_CALLWNDPROC" (401, Appendix 1) allows all the messages which would be sent directly to the application method [sic] to be filtered and received. These filters are installed when the ABMS application is initialized, this installation being indicated by numeral (40) in FIG. 2 and Appendix 1, and being carried out by the "SETWINDOWSHOOK" function. Closure of the ABMS application withdraws the filters, this withdrawal being shown by numeral (41) in FIG. 2 and Appendix 1, and is effected by the "UNHOOKWINDOWSHOOK" function. These installed filters can be passive, i.e. not affecting the messages, or active, namely causing a particular kind of processing arising from a certain specific event. In the case where the filter is passive, messages (301, 321, 311) arriving in the filter will be transmitted to the applications in the form of distributed messages (304, 324, 314), and in the case where the filter is active, it will send the message to the ABMS application for processing.

The options taken into account by the ABMS application can be divided into a number of scenarios which are classified in a threedimensional table (see FIG. 3) representing the actions, the means employed, and the status of the manipulated window. Realization of the ABMS application required a number of difficulties to be overcome, some of them general and noted below, and others specific to a scenario and indicated in the corresponding box in FIG. 3.

The general difficulties relate to terminating the action when canceled by the ESC key. At this time, restoration of the initial status assumes memorization of a number of pieces of information constituted by variables remaining in the data zone of the ABMS application. Another difficulty is interpenetration of keyboard/mouse scenarios. In fact, the frontier between the keyboard and mouse scenarios is not sealed so that a restart action with one of these means can be continued with the other at any time. ABMS takes this flexibility into account. Each message processed causes the general context of the application to evolve by modifying the contents of the variables or operating on parameters defined in the ABMS data zone, and leaves these variables in a clearly defined status that can be taken over by any other message. These variables are represented by:

"h_WndCurr," which is a variable showing that an action has been started in a window;

"h_WndMenu," which is the variable showing, in the case of an icon, whether one is in a menu run phase or an icon move phase;

"h_OldCursor," which is the variable allowing a Windows active cursor identifier to be memorized before the application is launched and the specific cursor of the application to be replaced;

"w_CXScreen," "w_CYScreen, w_CXframe, "w_CYMinHeight, w_CXMinWidth," "which are the variables of the window coordinates during sizing, frame, and minimum width;

"Frm_CurPos," which is the current position variable of the frame;

"Mse_CurPos," which is the current position variable of the mouse;

"w_Left, w_Top," "w_Right," "w_Bottom" "w_Caption," , which are the direction variables used to calculate the coordinates of the new window and the direction tests;

"Wnd_StartPos," which is the definition variable of the initial window position;

"Mse_StartPos," which is the definition variable of the initial cursor position;

"b_Cursor" and "b_LoadedIcon," which are Boolean variables assumed to be false at the start.

In the case of sizing a window which is not an icon, done only by the mouse, the operator must carry out the following operations:

He positions the mouse cursor on one of the edges of the window, presses the left button, and holds it down. He then moves the mouse, which has the effect of moving one of the edges of the frame representing the window ghost, on the screen. When the user believes he has reached the desired size, he releases the left button and the window is redrawn in the frame which has just been redefined. At the beginning of the operation, the filter installed by ABMS is initially in the passive state. All mouse move messages sent by "Windows" core (1) are distributed. When the operator presses the left mouse button, the cursor being at the edge of the window, "Windows" generates a "WM_NCLBUTTONDOWN" message whose parameters contain the window identifier and a value defining the zone at which the event occurred. The ABMS actions are then the following:

transition to active mode, memorization of identifier of HWND window for which the message and the initial coordinates are intended;

memorization of the type of action resulting from the click zone (left, right, top, bottom, diagonal sizing); this memorization is done by the ABMSHit test portion of the program numbered (501) in Appendices 1 and 7 and by the ABMSInit program numbered (502, 503) in Appendix 3;

appropriation of subsequent mouse messages (by the SETCAPTURE instruction) for the window in question;

first drawing of the ghost frame around the window by the ABMSInvertBlock procedure shown in Appendix 4 by number (521) which, upon each movement, cancels the previous ghost frame and redraws the next one at the new location;

neutralization of the message by replacing and substituting a "WM_ENTERIDLE" message which is not processed and causes no action by "Windows."

When the ABMS program is launched, a first function, shown by numeral (40) in Appendix 1, installs or deinstalls the filter function. The filter function is installed by the "SETWINDOWSHOOK" function and deinstallation is done by the "UNHOOKWINDOWSHOOK" function as shown by numerals (40, 41) in FIG. 2. Once this filter function is activated, all messages such as "WM_SYSCOMMAND, WM_LBUTTONUP, WM_SYSKEYDOWN, WM_NCLBUTTONDOWN, WM_MOUSEMOVE" are diverted, processed by the ABMSHook program, and neutralized by sending the "WM_ENTERIDLE" message of the application to "Windows." All these messages are initially sent by "Windows" after a keyboard or mouse interrupt.

Thus, as shown in FIG. 4, when the WM_NCLBUTTONDOWN" message, number (50), is sent by "Windows," this message is intercepted by the ABMSHook program which, in the first phase (504) memorizes the identifier of the window for which the message is intended, in variable "h_WndCurr", runs a test to find out whether the window is an icon, this test being shown in program (50) of Appendix 1 by line (500), memorizes the type of action resulting from the clicking zone by the portion of ABMSHit test program (501), Appendix 1, shown in detail in Appendix 7 by numeral (501), and runs subprogram ABMSInit (502, 503) in Appendix 1, shown in detail in Appendix 4 by numerals (502, 503). This program appropriates the later mouse messages by the "SETCAPTURE" message for the window in question and determines the initial coordinates of the window and of the cursor position. "WM_NCLBUTTONDOWN" processing sequence (50) sends back the "WM_ENTERIDLE" message at the end of processing.

The next message, sent by Windows, can be a mouse movement, indicated by the "WM_MOUSEMOVE" message and processed by the instruction sequence (51) in Appendix 1 at the end of which the program hands off to Windows by sending the "WM ENTERIDLE" message. The other instruction possibility is a mouse button release instruction, this instruction being indicated by the Windows message "WM_LBUTTONUP" whose processing sequence (52) is shown in Appendix 1. This sequence launches subprogram ABMSEnd which, at the end, hands off to core (1) of Windows to send the "WM_ENTERIDLE."

In the case of a "WM MOUSEMOVE" message sent by Windows, the program looks to see if the object is iconic by numeral (510) in Appendix 1; if it is not iconic, instruction (515) looks to see whether the direction variables have been in itialized and in this case launches the ABMSMove function (511), Appendix 5, and if not, the ABMSDirection function (512), Appendix 6, is launched to initialize the direction variables with the result of the ABMSTestDirect function (513), Appendix 8, as parameters. If the object is iconic, the sequence launches, by instruction number (5111), loading of the icon at the position indicated by the cursor and the ABMSLoadIcon function (5100). The sequence then hands off to Windows, sending the "WM_ENTERIDLE" message.

When ABMS intercepts a "WM_SYSKEYDOWN" message represented by numeral (53) in FIG. 4, processing of this message starts subprogram (53) which begins by processing the case of activation of a carriage return key when a "VK_RETURN" message or an escape message "VK_ESCAPE" is received and then processes the case of the left move key "VK_LEFT," up move key "VK_UP," right move key "VK_RIGHT," and down move key "VK_DOWN." Depending on the type of key depressed, it carries out the processing corresponding to one of the subprograms: (530) for leftward movement, (531) for upward movement, (532) for rightward movement, and (533) for downward movement.

As explained above, as soon as a message is received by the filter it is processed and the ABMS program, after the corresponding processing, hands off to core (1) of Windows which can then hand off to another application while waiting for the filter to intercept a new message whose processing requires intervention of the ABMS program. The filter remains active until the operator releases the left mouse button or hits "Enter" or "Esc." This action generates a "WM_LBUTTONUP, WM_SYSKEYDOWN, VK_ENTER, VK_ESCAPE" message which brings about the change in status of the ABMS filter from the active status to the passive status. The actions performed during this change are the following:

calculation of final window coordinates by the ABMSComputNewPos procedure, represented by subprogram (5210) in Appendix 5;

erasure of ghost by InvertBlock;

drawing window in final position;

resetting of memorized parameters to zero;

abandonment of ownership of mouse messages by "Release Capture" instruction;

transition of filter to passive mode.

As has just been explained, the ABMS application, because of the filter installed, receives the various messages "WM_SYSCOMMAND, WM_NCLBUTTONDOWN, WM_MOUSEMOVE, WM_LBUTTONUP, WM_SYSKEYDOWN, WM_KEYDOWN, WM_ACTIVATEAPP, WM_NCACTIVATE, WM ACTIVATE." This application replaces these messages, for the benefit of Windows, with a neutral message such as "WM ENTERIDLE" and then proceeds to process these messages, calling various principal processing functions called when it is detected that a processing is initialized. These principal processing functions are:

the ABMSInit function to initialize processing when a first "SC_MOVE" or an "SC_SIZE" is received in a "WM SYSCOMMAND";

This ABMSInit function consists of appropriating the mouse messages by the "SETCAPTURE" instruction, then looking to see whether the window is a child window of a parent window, namely written in the parent window to limit the movements of the child window, then initializing the initial window coordinates and the cursor position to become the current coordinates and initializing the characteristic parameters of the window (w_CXFrame, w_CXMinWidth, w_CYMinHeight).

then the ABMSEnd and the ABMSMove functions.

In addition to these three principal functions, there are utility functions called up at different points of the principal functions, which serve to carry out utility processing. These functions are:

The ABMSComputNewPos function which, when it is given the mouse coordinates, serves to calculate and update the window coordinates, taking global and remanent variables into account. This ABMSComputNewPos function (5210), Appendix 5, allows the new positions to be calculated from the W left, W_Caption, W_Top, W_Right, and W_Bottom parameters and the coordinates of the mouse and window frame to be calculated from the minimum height and width coordinates of the windows. It also tests the limits of these calculations, to ensure that a child window does not exit from a parent window.

The ABMSDirection function (512), Appendix 6, serves to determine the shape of the cursor and to initialize the direction variables as a function of the messages received. This ABMSDirection function (512), Appendix 6, for example in the case where the parameter sent back by ABMSTestDirection is D_Top, positions the W_Top parameter at 1 and hooks the cursor position to the upper edge of the window by instruction number (5120), then the sequence tests the W_Left parameter to find out whether W Left is initialized and, if it is, sends the message "D_TTOBDBLEARROW" to ask whether the cursor display is inclined at 40° upward and rightward. If W_Left is not initialized, the sequence looks to see whether W_Right is initialized and, if so, sends the message "D_BTOTDBLEARROW" to request the cursor to be displayed inclined upward and leftward, and if the test on W_Right is negative, a vertical cursor is displayed by execution of the "D_VERTDBLEARROW" message.

The function ABMSHitTest (501), Appendix 7, serves to determine upon initialization which zone has been clicked in to initialize the direction variables in the case of mouse movements. This function is called up by ABMSInit in the case where "WM_NCLBUTTONDOWN" is received and allows the W_Top, W_Right, W_Bottom, W_Left, and W_Caption variables to be initialized.

Thus, as can be seen in Appendix 7 when an HT_TopRight message is received, indicating that the top right corner has been clicked by the mouse, the ABMSHitTest function sets the W_Top and W_Right variables to zero which, when a new message is received, shows whether initialization has occurred in the upper right corner of the window and hence window movement or window sizing must be processed.

The ABMSInvertBlock function, represented by numeral (5030), Appendix 7, draws the rectangle by drawing four adjacent rectangles commanded by the PatBlt function as a function of the hDC parameters and the dimensions of the window represented for example by P_RecFrm.left. This PatBlt function by the DSTINVERT command, at the same time inverts the window ghost.

The ABMSLoadCursor function (5031), Appendix 7, which loads the cursor as a function of the parameters sent which depend on the position of the window's edge; thus, if the W_Left and W_Top parameters are initialized at 1, one is dealing with the upper left edge of the window and the cursor initialized will look like an arrow pointing at the lower right edge of the window, namely at 45°.

The ABMSLoadIcon function (5100), Appendix 8, which, when a static icon has been moved, allows the cursor to be replaced by the image of the static icon generated by Windows, and if a dynamic icon has been moved, allows this dynamic icon image to be replaced by an image constituted by the cursor.

The ABMSTestDirect function, shown at numeral (513) of Appendix 8, determines the parameter to be sent back, for example D_Left (5130), by testing the information received by the application and sent by Windows, constituted by the X coordinate of the position of the mouse represented by P_MSEPOS.X and compares this coordinate to the value of the left position of the window, and if the value of the X coordinate of the mouse is less than the abscissa of the window's left edge, this function returns the D_Left message to the application. This function is used in conjunction with the ABMSDirection function, The ABMSMove function (511), Appendix 5, allows the window to be moved by inverting the ghost of the window by the ABMSInvertBlock function, represented by reference (5030) in Appendices 5 and 7, then calculates the new position of the window by the ABMSComputNewPos function (5210), and finally inverts the window ghost for the new position calculated, represented by reference (5112).

The ABMSEnd function (521), Appendix 4, ends the process by using instruction (5211) to find out whether the window is iconic. If it is not iconic, the ending is a normal ending (5212), namely launching the ABMSComputNewPos function (5210); if not, the cursor, by instruction (5213), resumes its initial starting position. By sequence (5214), this function also allows it to be determined whether the window being processed is a child window and in this case converts the coordinates before a movement. Likewise, this function, if necessary, uses sequence (5215) to restore the cursor and resets the parameters to zero by sequence (5216).

Application by the CalMsgHook filter allows messages which would have been sent directly to the application method, including the "WM_SYSCOMMAND, WM_ACTIVATEAPP, WM_NCACTIVATE, WM_ACTIVATE" messages, to be filtered and received. Processing of the "WM_SYSCOMMAND" message shown at (54) can be broken down into processing either of a "SC_MOVE" or of a "SC SIZE" message. The "SC_SIZE" message positions the W_Caption parameters at 1 and the window sizing message "SC_SIZE" triggers the processing represented by number (540). When the application receives a window sizing message, it asks (5401) for the cursor position, requiring it to be that of the mouse. Then, at (5402) this procedure launches the ABMSInit function and the cursor position (5403) is made to agree with the action performed and at the end of processing the application sends back to Windows the message "WM_ENTERIDLE," numbered 541, which thus replaces the "WM_SYSCOMMAND" message.

Likewise, the GetMsgHook filter filters the "WM_NCLBUTTONDOWN, WM_MOUSEMOVE, WM_LBUTTONUP, WM_KEYDOWN, WM_SYSKEYDOWN" messages. When such a "WM_NCLBUTTONDOWN" message arrives at the ABMS application, using instruction number 504, one looks to see whether it is a menu run or not. If it is not a menu run, one looks at number 500 to see whether one is working for an icon. If one is not working for an icon, one looks to see whether the parameters have been initialized by the ABMSHitTest function (501). If the parameters have not been initialized, one launches the ABMSInit function (502, 503) by storing in the point the X and Y coordinates furnished by the message parameter, and then the "WM_ENTERIDLE" message (505) is sent to Windows to hand off to it. In the case of a "WM_MOUSEMOVE" message sent by Windows, the program looks at (510), Appendix 1, to see whether the object is iconic; if it is not iconic, instruction (515) looks to see whether the direction variables have been initialized and in this case launches the ABMSMove (511) function, Appendix 5; if not, the ABMSDirection function (512), Appendix 6, is launched to initialize the direction variables with the result of the ABMSTestDirect function (513), Appendix 8, as parameters. If the object is iconic, the sequence uses instruction (5111) to launch loading of the icon at the position indicated by the cursor and function ABMSLoadIcon (5100). Next, the sequence hands off to Windows by sending the message "WM_ENTERIDLE."

If the message "WM_LBUTTONUP" is received from the application, one looks at (510) to see whether the operator has run the menu; if not, the application looks to see whether the window coordinate corresponds to the mouse coordinate and launches the ABMSEnd function (521) and then sends the "WM_ENTERIDLE" message to Windows.

In the case of messages sent after a key is depressed, the application begins at numeral 534 to handle the case of abort keys constituted by the escape (VK_ESCAPE) and carriage return (VK_RETURN) keys. If this is not the case and the application has received the VK_Left message, the application first looks at the sequence numbered 530 if in the icon mode and loads the icon by function ABMSLoadIcon (5100), then looks using instruction (5301) to see whether parameters W_Caption, W_Left, and W_Right have been initialized and, if they have, moves the icon or gives it the actual magnitude by sequence (5302). If the icon mode is not operating at this point in time, the ABMSMove function is launched and the position of the mouse is given to the position of the cursor. Otherwise, ABMS launches the ABMSDirection function and then sends the message "WM_ENTERIDLE" back to Windows.

The operation of the other parts of the program handling the various events that can occur and calling on the main processing functions or on the utility functions may be deduced from the above explanations and the listing in the appendices.

Any modification within the reach of the individual skilled in the art will also be part of the spirit of the invention.

~~ANNEXE~~ Appendix 1

```
/*****************Install and UnInstall Functions*************************/
void FAR PASCAL OpenHook(HWND P_hWnd)
{
   h_WndIcon = P_hWnd;

   w_CXScreen = GetSystemMetrics (SM_CXSCREEN);
   w_CYScreen = GetSystemMetrics (SM_CYSCREEN);

   lp_fnOldGetMsgHook =                               400
      (FARPROC)SetWindowsHook(WH_GETMESSAGE, (FARPROC)GetMsgHook);
   lp_fnOldCalMsgHook =
      (FARPROC)SetWindowsHook(WH_CALLWNDPROC, (FARPROC)CalMsgHook);
}                                                     401
/******************************************************************/       40
BOOL FAR PASCAL CloseHook()
{
   UnhookWindowsHook(WH_CALLWNDPROC, (FARPROC)CalMsgHook);
   return ((BOOL)UnhookWindowsHook(WH_GETMESSAGE, (FARPROC)GetMsgHook));
}                                                                          41
/******************************************************************/

/*************************** Hook Functions ****************************/
DWORD FAR PASCAL CalMsgHook(int iCode, WORD wParam, LONG lParam)
{
   MYMSG       Msg;
   POINT       MsePos;

   if (iCode < 0)
      return (DefHookProc(iCode, wParam, lParam, &lp_fnOldGetMsgHook));

   /* The current message is to be processed */
   Msg = * (( LPMYMSG)lParam);
   switch (Msg.message) {
     case WM_SYSCOMMAND:
       switch (Msg.wParam) {
         case SC_MOVE:
           w_Caption = 1;
         case SC_SIZE:                          5401
           GetCursorPos (&MsePos);
           ABMSInit (Msg.hwnd, D_CURSORMOVESIZEWND, MsePos);     5402
           /* Cursor must be set according to the action */
           Mse_CurPos.x = Wnd_StartPos.left + (Wnd_StartPos.right/2);
540        Mse_CurPos.y = Wnd_StartPos.top+ ((Msg.wParam == SC_MOVE) ?     54
                                    10 : (Wnd StartPos.bottom/2));
           SetCursorPos(Mse_CurPos.x, Mse_CurPos.y);
           ((LPMYMSG)lParam)->message = WM_ENTERIDLE;            5403
           break;
                                        541
         default:
           break;
         }
       break;

     case WM_ACTIVATEAPP:
     case WM_NCACTIVATE:
     case WM_ACTIVATE:
       if (h_WndCurr && (Msg.hwnd != h_WndCurr) && (Msg.wParam != 0))
         ((LPMYMSG)lParam)->wParam = 0;
       break;                                                              55

     default:
       break;
     }
   return (DefHookProc(iCode, wParam, lParam, &lp_fnOldCalMsgHook));
}
/**********************************************************************/
```

Appendix continued

~~ANNEXE~~ 1 (~~suite~~)

```
DWORD FAR PASCAL GetMsgHook(int iCode, WORD wParam, LONG lParam)
{
   MSG        Msg;
   POINT      MsePos;

   if (iCode < 0)
      return (DefHookProc(iCode, wParam, lParam, &lp_fnOldGetMsgHook));

   /* The current message is to be processed */
   Msg = *((LPMSG)lParam);
   switch (Msg.message) {                                                  ⎫
      case WM_NCLBUTTONDOWN:                                               ⎪
         if ((h_WndCurr != Msg.hwnd) && (h_WndMenu != Msg.Hwnd)) {         ⎪
504         /* No selection and Not sent to init the system menu */        ⎪
500         if (IsIconic (Msg.hwnd)) Msg.wParam = HTCAPTION;               ⎪
501         if [ABMSHitTest] (Msg.wParam)) {                               ⎬ 50
               SetFocus (Msg.hwnd);                                        ⎪
503,502         [ABMSInit] (Msg.hwnd, 0, MAKEPOINT(Msg.lParam));           ⎪
               ((LPMSG)lParam)->message = WM_ENTERIDLE;                    ⎭
               }                           505
         }
         break;

      case WM_MOUSEMOVE:                                                   ⎫
         if (h_WndCurr == Msg.hwnd) {                                      ⎪
            MsePos = MAKEPOINT(Msg.lParam);                                ⎪
            ClientToScreen(Msg.hwnd, &MsePos);                             ⎪
510         if (!IsIconic(Msg.hwnd)) {                                     ⎪
515            if (w_Caption+w_Top+w_Left+w_Bottom+w_Right !=0)            ⎪
511               [ABMSMove] (MsePos);                                     ⎪
               else                                                        ⎬ 51
512               ABMSDirection (ABMSTestDirect (MsePos));                 ⎪
               }                           513                             ⎪
            else {                                                         ⎪
5111           if (!b_LoadedIcon &&                                        ⎪
               ((MsePos.x != Mse_CurPos.x) || (MsePos.y != Mse_CurPos.y))) ⎪
5100              ABMSLoadIcon (Msg.hwnd);                                 ⎪
               }                                                           ⎪
            ((LPMSG)lParam)->message = WM_ENTERIDLE;                       ⎪
            }                                                              ⎪
         break;                           514                              ⎭
```

Appendix

~~ANNEXE~~ 2

```
case WM_LBUTTONUP:
  if (h_WndMenu == Msg.hwnd)
    h_WndMenu = NULL;   /*End of init system menu process */
  else {
    if (h_WndCurr == Msg.hwnd) {
      MsePos = MAKEPOINT(Msg.lParam);
      ClientToScreen (Msg.hwnd, &MsePos);
      ABMSEnd (Msg.hwnd, TRUE, FALSE, MsePos);
      ((LPMSG)lParam)->message = WM_ENTERIDLE;
      }
    }
  break;

case WM_KEYDOWN:
case WM-SYSKEYDOWN:
  if (h_WndCurr == Msg.hwnd) {
    switch (Msg.wParam) {
      case VK_ESCAPE:
      case VK_RETURN:
        GetCursorPos(&MsePos) ;
        ABMSEnd (Msg.hwnd, (Msg.wParam==VK_RETURN), TRUE, MsePos);
        ((LPMSG)lParam)->message = WM_ENTERIDLE;
        break;

      case VK_LEFT:
      if (IsIconic (Msg.hwnd) && !b_LoadedIcon)
        ABMSLoadIcon (Msg.hwnd);
      if (w_Caption || w_Left || w_Right) {
        /* Move or Real Size */
        GetCursorPos(&MsePos);
        MsePos.x -= D_MOUSESTEP;
        MsePos.x = max (0, MsePos.x);
        if (!IsIconic (Msg.hwnd)) ABMSMove (MsePos);
        SetCursorPos(MsePos.x, MsePos.y);
        }
      else
        ABMSDirection (D_LEFT);
      ((LPMSG)lParam)->message = WM_ENTERIDLE
      break;

      case VK_UP:
      if (IsIconic (Msg.hwnd) && !b_LoadedIcon)
        ABMSLoadIcon (Msg.hwnd);
      if (w_Caption || w_Top || w_Bottom) {
        /* Move or Real Size */
        GetCursorPos(&MsePos);
        MsePos.y -= D_MOUSESTEP
       MsePos.y = max (0, MsePos.y);
        if (!IsIconic (Msg.hwnd)) ABMSMove (MsePos);
        SetCursorPos(MsePos.x, MsePos.y);
        }
      else
        ABMSDirection (D_TOP);
      ((LPMSG)lParam)->message = WM_ENTERIDLE;
      break;
```

Reference labels: 520, 521, 52, 534, 5100, 5301, 5302, 530, 531, 53

APPENDIX continued

~~ANNEXE~~ 2 ~~(Suite)~~

532

```
case VK_RIGHT:
if (IsIconic (Msg.hwnd) && !b_LoadedIcon)
   ABMSLoadIcon (Msg.hwnd);
if (w_Caption || w_Left || w_Right) {
   /* Move or Real Size */
   GetCursorPos(&MsePos);
   MsePos.x += D_MOUSESTEP
  MsePos.x = min (w_CXScreen, MsePos.x);
   if (!IsIconic (Msg.hwnd)) ABMSMove (MsePos);
   SetCursorPos(MsePos.x, MsePos.y);
   }
else
   ABMSDirection (D_RIGHT);
((LPMSG)lParam)->message = WM_ENTERIDLE
break;
```

533

53

```
case VK_DOWN:
if (IsIconic (Msg.hwnd) && !b_LoadedIcon)
   ABMSLoadIcon (Msg.hwnd);
if (w_Caption || w_Top || w_Bottom) {
   /* Move or Real Size */
   GetCursorPos(&MsePos);
  MsePos.y += D_MOUSESTEP
   MsePos.y = min (w_CYScreen, MsePos.y);
   if (!IsIconic (Msg.hwnd)) ABMSMove (MsePos);
   SetCursorPos(MsePos.x, MsePos.y);
   }
else
   ABMSDirection (D_BOTTOM);
((LPMSG)lParam)->message = WM_ENTERIDLE;
break;
default:
   break;
   }
  }
 break;

 default:
   break;
 }
return (DefHookProc(iCode, wParam, lParam, &lp_fnOldGetMsgHook));
}
/***************************************************************************/
```

Appendix

~~ANNEXE~~ 3

```
/************************* Steps Functions *********************************/
VOID ABMSInit (HWND P_hWnd, WORD P_wCursor, POINT P_MsePos)
{
   LONG lStyle;
   RECT ClipRect;

   /* Selection begins at this point */
   h_WndCurr = P_hWnd;
   SetCapture(P_hWnd);

   /*If current window is a child one, limits its movement */
   lStyle = GetWindowLong (P_hWnd, GWL_STYLE);
   if (lStyle & WS_CHILD) {
       HWND hParent;
       hParent = GetParent (P_hWnd);
       GetClientRect (hParent, &ClipRect);
       ClientToScreen (hParent, (LPPOINT)&ClipRect);
       ClientToScreen (hParent, (LPPOINT)&(ClipRect.right));
       ClipCursor (&ClipRect);
   }

  /* Initialize the Window initial Coordinates and the cursor initial*/
  /* position...                                                     */
  GetWindowRect(P_hWnd, &Wnd_StartPos);
  Wnd_StartPos.right -= Wnd_StartPos.left;
  Wnd_StartPos.bottom -= Wnd_StartPos.top;
  Mse_StartPos = P_MsePos;

  /* ... which are also the current one !                            */
  Frm_CurPos = Wnd_StartPos;
  Mse_CurPos = Mse_StartPos;

  /* Initialize the Window characteristics parameters.               */
  w_CXframe = GetSystemMetrics (SM_CXFRAME);
  w_CXMinWidth = GetSystemMetrics(SM_CXMINTRACK);
  w_CYMinHeigth = GetSystemMetrics (SM_CYMINTRACK);

  if (!IsIconic (P_hWnd))
     ABMSInvertBlock(Frm_CurPos, w_CXframe);

  if (P_wCursor) ABMSLoadCursor (P_wCursor);
}
/***********************************************************************/
```

502 (lines from VOID ABMSInit through ClipCursor)

503 (lines from Initialize the Window initial Coordinates through if (P_wCursor))

Appendix

~~ANNEXE~~ A 4

```
VOID ABMSEnd (HWND P_hWnd, BOOL P_bNormalEnd, BOOL bRestoreMse,
              POINT P_MsePos)
{
  LONG lStyle;
5211
  if (!IsIconic (P_hWnd)) ABMSInvertBlock(Frm_CurPos, w_CXframe);
  if (P_bNormalEnd)
5212  ABMSComputNewPos (P_MsePos);  5210
  else
    Frm_CurPos = Wnd_StartPos;  5213

  /* If current Window is a child one, converts coord. before move */
  lStyle = GetWindowLong (P_hWnd, GWL_STYLE);
  if (lStyle & WS_CHILD) {
    HWND hParent;
5214  hParent = GetParent (P_hWnd);
    ScreenToClient(hParent, (LPPOINT)&Frm_CurPos);
    ClipCursor (NULL);
    }

  MoveWindow(P_hWnd, Frm_CurPos.left, Frm_CurPos.top,
                     Frm_CurPos.right, Frm_CurPos.bottom, TRUE);

  /* Restore Cursor if needed */
  if (h_OldCursor)
    SetCursor (h_OldCursor);                                    521
  else
    if (b_Cursor) SendMessage (h_WndIcon, WM_DDE_ACK, 0, 0L);
  if (bRestoreMse) SetCursorPos(Mse_StartPos.x, Mse_StartPos.y);

  if (IsIconic(P_hWnd)) {
5215 if (!b_LoadedIcon) {
      h_WndMenu = P_hWnd;
      PostMessage(P_hWnd, WM_NCLBUTTONDOWN, HTCAPTION,
                  MAKELONG (P_MsePos.x, P_MsePos.y));
      PostMessage(P_hWnd, WM_LBUTTONUP, 0,
                  MAKELONG (P_MsePos.x, P_MsePos.y));
      }
    else {
      ShowWindow(P_hWnd, SW_SHOWMINIMIZED);
      SetFocus (P_hWnd);
      }
    }

  w_Left = 0;
  w_Top = 0;
  w_Right = 0;
  w_Bottom = 0;
  w_Caption = 0;

  b_Cursor = FALSE;
  h_OldCursor = NULL;
  b_LoadedIcon = FALSE;
  ReleaseCapture();
  h_WndCurr = NULL;
}
/*************************************************************************/
```

Appendix

~~ANNEXE~~ 5

```
VOID ABMSMove (POINT P_MsePos)                                    511
{
   ABMSInvertBlock(Frm_CurPos, w_CXframe);—5030
   ABMSComputNewPos(P_MsePos); ————————5210
   ABMSInvertBlock(Frm_CurPos, w_CXframe);—5112
}
/***************************************************************************/

/************************* Utilities Functions *************************/
void ABMSComputNewPos(POINT P_MsePos)
{
   POINT      MseNewPos;
   RECT       FrmNewPos;

   /* Compute Usable New Cursor Position by including the size limits */
   MseNewPos = P_MsePos;
   MseNewPos.x = (w_Left+w_Right) ?
    (w_Left * min(MseNewPos.x, Frm_CurPos.left+Frm_CurPos.right-w_CXMinWidth)
     + w_Right * max(MseNewPos.x, Frm_CurPos.left+w_CXMinWidth)) :
     MseNewPos.x;
   MseNewPos.y = (w_Top+w_Bottom) ?
     (w_Top * min (MseNewPos.y, Frm_CurPos.top+Frm_CurPos.bottom-w_CYMinHeigth)
     + w_Bottom * max (MseNewPos.y, Frm_CurPos.top+w_CYMinHeigth)) :
     MseNewPos.y ;
                                                                   5210
   /* Compute New Frame Position and Size */
   FrmNewPos.left = (w_Left+w_Caption) * MseNewPos.x
                  + (1-w_Left) *Frm_CurPos.left - w_Caption * Mse_CurPos.x;
   FrmNewPos.top = (w_Top+w_Caption) * MseNewPos.y
                 + (1-w_Top) * Frm_CurPos.top - w_Caption * Mse_CurPos.y;
   FrmNewPos.right = (w_Right-w_Left) * (MseNewPos.x - Frm_CurPos.left)
                   + (1-w_Right) * Frm_CurPos.right;
   FrmNewPos.bottom = (w_Bottom-w_Top) * (MseNewPos.y - Frm_CurPos.top)
                    + (1-w_Bottom) * Frm_CurPos.bottom;

   /* Save the New Current Values for Mouse Position and Frame Coord.*/
   Mse_CurPos = P_MsePos;
   Frm_CurPos = FrmNewPos;
}
/********************************************************************/
```

Appendix

~~ANNEXE~~ 6

```
VOID ABMSDirection (WORD P_wDirect)
{
   WORD wCursor = 0;

   switch (P_wDirect) {
      case D_LEFT:
         w_Left = 1;
         Mse_CurPos.x = Frm_CurPos.left;
         wCursor = (w_Top) ? D_TTOBDBLEARROW :
                          ((w_Bottom) ? D_BTOTDBLEARROW :
                                        D_HORZDBLEARROW);
         break;

      case D_TOP:
         w_Top = 1;
         Mse_CurPos.y = Frm_CurPos.top;        5120
         wCursor = (w_Left) ? D_TTOBDBLEARROW :
                          ((w_Right) ? D_BTOTDBLEARROW :
                                       D_VERTDBLEARROW);
         break;
                                                          512
      case D_RIGHT:
         w_Right = 1;
         Mse_CurPos.x = Frm_CurPos.left+Frm_CurPos.right;
         wCursor = (w_Bottom) ? D_TTOBDBLEARROW :
                           ((w_Top) ? D_BTOTDBLEARROW :
                                      D_HORZDBLEARROW);
         break;

      case D_BOTTOM:
         w_Bottom = 1;
         Mse_CurPos.y = Frm_CurPos.top+Frm_CurPos.bottom;
         wCursor = (w_Right) ? D_TTOBDBLEARROW :
                          ((w_Left) ? D_BTOTDBLEARROW :
                                      D_VERTDBLEARROW);
         break;

      default :
         return;
         break;
      }

   SetCursorPos(Mse_CurPos.x, Mse_CurPos.y);
   SendMessage (h_WndIcon, WM_DDE_EXECUTE, wCursor,OL);
   b_Cursor = TRUE;
}
/***********************************************************************/
```

Appendix

~~ANNEXE~~ A 7

```
BOOL ABMSHitTest (WORD P_wHit) {
   switch (P_wHit) {
      case HTTOP:
         w_Top = 1;break;
      case HTTOPRIGHT:
         w_Top = 1;w_Right = 1;break;
      case HTRIGHT:
         w_Right = 1;break;
      case HTBOTTOMRIGHT:
         w_Bottom = 1;w_Right = 1;break;
      case HTBOTTOM:
         w_Bottom = 1;break;
      case HTBOTTOMLEFT:
         w_Bottom = 1;w_Left = 1;break;
      case HTLEFT:
         w_Left = 1;break;
      case HTTOPLEFT:
         w_Top = 1;w_Left = 1;break;
      case HTCAPTION:
         w_Caption = 1;break;
      default:
         return FALSE;
         break;
      }
   return TRUE;
}
/**************************************************************************/
```

501

```
void ABMSInvertBlock(RECT P_RecFrm,WORD P_Width)
{
   HDC  hDC;

   hDC = CreateDC("DISPLAY", NULL, NULL, NULL);
   PatBlt(hDC, P_RecFrm.left, P_RecFrm.top,
               P_RecFrm.right-P_Width, P_Width, DSTINVERT);
   PatBlt(hDC, P_RecFrm.left+P_RecFrm.right-P_Width, P_RecFrm.top,
               P_Width, P_RecFrm.bottom-P_Width, DSTINVERT);
   PatBlt(hDC, P_RecFrm.left+P_Width, P_RecFrm.top+P_RecFrm.bottom-P_Width,
               P_RecFrm.right-P_Width, P_Width, DSTINVERT);
   PatBlt(hDC, P_RecFrm.left, P_RecFrm.top+P_Width,
               P_Width, P_RecFrm.bottom-P_Width, DSTINVERT);
   DeleteDC(hDC);
}
/***************************************************************************/
```

5030

```
VOID ABMSLoadCursor (WORD P_wCursor)
{
   SendMessage (h_WndIcon, WM_DDE_EXECUTE, P_wCursor, OL);
   b_Cursor = TRUE;
```

5031

Appendix

~~ANNEXE~~ 8

```
}
/*********************************************************************/

VOID ABMSLoadIcon (HWND P_hWnd)
{
   HCURSOR   hIcon;

   ShowWindow(P_hWnd, SW_HIDE);
   SetFocus (P_hWnd);
   if (hIcon = (HCURSOR)GetClassWord(P_hWnd, GCW_HICON))
      h_OldCursor = SetCursor(hIcon);
   else
      ABMSLoadCursor (D_CURSORMOVEICON);
   b_LoadedIcon = TRUE;
}
/*********************************************************************/

WORD ABMSTestDirect (POINT P_MsePos)
{
   if (P_MsePos.x <= Frm_CurPos.left) return (D_LEFT);
   if (P_MsePos.x >= (Frm_CurPos.left+Frm_CurPos.right)) return (D_RIGHT);
   if (P_MsePos.y <= Frm_CurPos.top) return (D_TOP);
   if (P_MsePos.y >= (Frm_CurPos.top+Frm_CurPos.bottom)) return (D_BOTTOM);
   return (0);
}
/*********************************************************************/
```

5100

513

What is claimed is:

1. A method for sizing or moving one of a plurality of windows displaying respective applications including a first window displaying a first application and a second window displaying a second application in a windowed operating system, comprising the steps of:

establishing at least one filter between said windowed operating system and said windows displaying respective applications;

intercepting at least one message travelling between an input device communicating with said windowed operating system and said first window displaying said first application with said at least one filter;

processing said at least one message by a specific application; and returning a neutral message to said windowed operating system, said neutral message not requiring said windowed operating system to take further action and allowing said windowed operating system to proceed with processing tasks in said second window displaying said second application.

2. The method of claim 1 wherein the step of processing said at least one message further comprises the steps of:

processing each of a plurality of mouse and keyboard events that correspond to a window moving or window sizing event; and initializing a plurality of window parameters.

3. The method of claim 2 wherein said plurality of application window parameters includes:

a variable indicating whether an action has been started in said first window displaying said first application;

a variable indicating whether an icon has been loaded;

a variable indicating whether said icon is in a menu run phase or icon move phase;

a variable indicating an active cursor identifier;

a plurality of variables indicating coordinates of said first window displaying said first application and a minimum width during sizing and framing;

a variable indicating a current position of said first window displaying said first application;

a variable indicating a current mouse position;

a plurality of variables recording directional information associated with said plurality of mouse and keyboard events;

a variable recording an initial position of said first window displaying said first application;

a variable recording an initial position of a cursor; and a plurality of Boolean variables initially assumed to be false.

4. The method of claim 2 wherein said filter establishing step comprises the steps of providing a first filter for receiving a plurality of hardware interrupts and providing and a second filter for filtering and receiving messages sent to said windows displaying respective applications.

5. The method according to claim 4 wherein said step of intercepting said at least one message further comprises the steps of:

triggering processing of said at least one message by said specific application;

accessing said plurality of window parameters; and using a plurality of functions to initialize processing by said specific application, to move said first window displaying said first application, and to end processing of said at least one message by said specific application.

6. The method according to claim 5 wherein said initialize processing function processes only mouse events associated with a mouse button being pressed and keyboard events requesting resizing of said first window displaying said first application.

7. The method according to claim 5, wherein said end processing function processes only mouse events associated with a mouse button being released and keyboard events associated with an escape key input and a return key input.

8. The method according to claim 5 wherein said move function processes only mouse events associated with mouse movement and keyboard events associated with directional key input.

9. The method according to claim 6 wherein said initialize processing function further comprises the steps of:

reading mouse events in a manner that excludes reading of said mouse events by other functions;

determining whether said first window is written inside a parent window in order to limit movement of said first window, and initializing coordinates of said first window and a cursor to become current coordinates and initializing characteristic parameters of said first window.

10. A method for sizing or moving one of a plurality of windows displaying respective applications in a windowed operating system, comprising the steps of:

establishing at least one filter between said windowed operating system and said window displaying a respective application;

intercepting at least one message travelling between said windowed operating system and said window displaying said respective application;

processing said at least one intercepted message by a specific application, wherein said step of processing said message comprises the steps of:

activating said at least one filter, storing in a memory a plurality of window parameters for said window displaying said respective application to which said at least one intercepted message is sent, storing in the memory the type of action requested by said at least one intercepted message exclusively appropriating later mouse events for processing by said specific application, and drawing a ghost frame around said window displaying said respective application; and returning a neutral message to said windowed operating system, wherein said neutral message does not require said windowed operating system to take further action and allows said windowed operating system to proceed with processing tasks in other ones of said plurality of windows displaying respective applications.

11. The method of claim 10 further comprising the steps of:

calculating a final position of said window displaying said respective application;

erasing the ghost frame;

drawing said window displaying said respective application in said final position; and resetting said a plurality of window parameters to zero.

12. The method of claim 11 further comprising the steps of:

allowing mouse messages to be read by other functions; and deactivating said at least one filter.

13. A method for sizing or moving one of a plurality of windows displaying respective applications including a first window displaying a first application and a second window displaying a second application in a windows operating system, comprising the steps of:

establishing a filter between said windows operating system and said plurality of windows displaying respective applications;

intercepting at least one message travelling between an input device communicating with said windows operating system and said first window displaying said first application with said filter, said message corresponding to a window resizing or moving command and having a plurality of later mouse or keyboard events associated therewith;

processing said at least one intercepted message by a specific application dedicated to processing only window resizing or moving commands; and returning a neutral message to said windows operating system, wherein said neutral message does not require said windows operating system to take further action and allows said windows operating system to process tasks in said second window displaying said second application while said specific application processes said later mouse or keyboard events.

14. The method of claim 13 wherein the step of processing said at least one intercepted message further comprises the step of:

initializing a plurality of window parameters.

15. The method of claim 14 wherein said plurality of window parameters include:

a variable indicating whether an action has been started in said first window displaying said first application ("h_WndCurr");

a variable indicating whether an icon has been loaded ("b_LoadedIcon");

a variable indicating whether said icon is in a menu run phase or an icon move phase ("h_WndMenu");

a variable indicating an active cursor identifier ("h_OldCursor");

a plurality of variables indicating coordinates of said first window displaying said first application and a minimum width during sizing and framing ("w_CXScreen," "w_CYScreen," "w_CXframe," "w_CYMinHeight" and "w_CXMinWidth");

a variable indicating a current position of said first window displaying said first application ("Frm_CurPos");

a variable indicating a current mouse position ("Mse_CurPos");

a plurality of variables recording directional information associated with said plurality of mouse and keyboard events ("w_Left," "w_Top," "w_Right," "w-Bottom" and "w-Caption");

a variable recording an initial position of said first window displaying said first application ("Wnd_StartPos");

a variable recording an initial position of a cursor ("Mse_StartPos"); and a plurality of Boolean variables assumed to be false when the filter is established ("b_Cursor" and "b_LoadedIcon").

16. The method of claim 13 wherein said filter establishing step comprises the steps of:

providing a first filter for receiving a plurality of hardware interrupt messages and providing a second filter for filtering and receiving messages sent to said windows displaying respective applications.

17. The method according to claim 14 wherein said step of intercepting said at least one message further comprises the steps of:

triggering processing of said at least one intercepted message by said specific application;

retrieving said plurality of window parameters; and using a plurality of processing functions selected from the group consisting of: a first function to initialize processing of said at least one message by said specific application; a second function to move said first window; and a third function to end processing of said at least one message by said specific application.

18. The method of claim 17 wherein said first function processes only messages (WM_BUTTONDOWN) sent when mouse events associated with a mouse button being pressed occur and messages (SC_SIZE) sent when keyboard events requesting that one of said plurality of windows displaying respective applications be resized.

19. The method of claim 17 wherein said third function processes only messages (WM_BUTTONUP) sent when mouse events associated with a mouse button being released occur, messages (VK_ESCAPE) sent when keyboard events associated with an escape key being pressed occur, and messages (VK_RETURN) sent when keyboard events associated with a return key being pressed occur.

20. The method of claim 17 wherein the second function processes only messages (WM_MOUSEMOVE) sent when mouse events associated with mouse movement occur and messages (VK_LEFT, VK_UP, VK_RIGHT and VK_DOWN) sent when keyboard events associated with directional keys being pressed occur.

21. The method of claim 18 wherein the step of using said first function comprises the steps of:

exclusively reading mouse events by issuing an instruction ("SETCAPTURE");

determining whether the first window is a child window, namely written in a parent window to limit the movements of the child window; and initializing coordinates of the first window and a cursor to become current coordinates and initializing characteristic parameters of the first window ("w_CXframe," "w_CXMinWidth" and "w_CYMinHeight").

22. A method for sizing or moving one of a plurality of windows displaying respective applications including a first window displaying a first application and a second window displaying second application running under a windows operating system, comprising the steps of:

establishing at least one filter between said windows operating system and said windows displaying respective applications;

intercepting at least one message travelling between an input device communicating with said windows operating system and said first window displaying said first application;

processing said intercepted message by a specific application, wherein said step of processing said at least one message includes the steps of:

activating said at least one filter;

memorizing a variable ("h_Wnd") identifying said first window to which said intercepted message is sent;

using a function ("HitTest") to determine and memorize the type of action requested by said intercepted message;

exclusively appropriating later mouse events associated with said at least one message for processing by said specific application; and drawing a ghost frame around said first window; and returning to said windows operating system a neutral message (WM_ENTERIDLE), wherein said neutral message (WM_ENTERIDLE) requires said windows operating system to take no action and allows said windows operating system to proceed with processing tasks in said second window displaying said second application while said later mouse events are processed by said specific application.

23. The method of claim 22 further comprising the steps of:

calculating final coordinates of said first window corresponding to a final position or final size of said first window;

erasing the ghost frame;

drawing the first window in said final position; and resetting memorization parameters corresponding to said variable identifying said first window and said type of action requested by said intercepted message to zero.

24. The method of claim 23 further comprising the steps of:

abandoning ownership of said mouse messages by issuing a release capture instruction; and deactivating said at least one filter.

* * * * *

UNITED STATES PATENT AND TRADEMARK OFFICE

CERTIFICATE OF CORRECTION

PATENT NO. : 5,455,904 Page 1 of 2

DATED : October 3, 1995

INVENTOR(S) : Alain Bouchet, et al

It is certified that error appears in the above-indentified patent and that said Letters Patent is hereby corrected as shown below:

Column 3, line 54, " 'mouse" " should read -- "mouse" --.

Column 4, line 31, "(301, 311, 321, 331)" should read --301, 311, 321--.

Column 5, line 10, "threedimensional" should read --three-dimensional--.

Column 7, line 3, " "WMENTERIDLE" " should read -- "WM__ENTERIDLE" --.

Column 7, line 10, " "WM MOUSEMOVE" " should read -- "WM__MOUSEMOVE" --.

Column 7, line 14, "in itialized" should read —in-itialized—.

Column 7, line 67, "WM ACTIVATE" should read --WM__ACTIVATE--.

Column 8, line 2, " "WM ENTERIDLE" " should read -- "WM__ENTERIDLE" --.

Column 8, line 9, " "WM SYSCOMMAND" " should read -- "WM__SYSCOMMAND" --.

UNITED STATES PATENT AND TRADEMARK OFFICE

CERTIFICATE OF CORRECTION

PATENT NO. : 5,455,904

DATED : October 3, 1995

INVENTOR(S) : Alain Bouchet, et al

It is certified that error appears in the above-indentified patent and that said Letters Patent is hereby corrected as shown below:

Column 9, line 57, " "SC SIZE" should read --"SC___SIZE"--.

Signed and Sealed this

Twenty-seventh Day of August, 1996

Attest:

BRUCE LEHMAN

*Attesting Officer* — *Commissioner of Patents and Trademarks*